United States Patent
Inoue et al.

[11] Patent Number: 6,055,360
[45] Date of Patent: Apr. 25, 2000

[54] HEATING HEAT EXCHANGER WITH ELECTRIC HEAT EMITTER

[75] Inventors: Yoshimitsu Inoue, Chiryu; Mikio Fukuoka, Bisai; Reijiro Okano, Chiryu; Koji Takahashi, Kariya, all of Japan

[73] Assignee: Denso Corporation, Kariya, Japan

[21] Appl. No.: 09/039,937

[22] Filed: Mar. 16, 1998

[30] Foreign Application Priority Data

Mar. 18, 1997 [JP] Japan ................................. 9-064788
Dec. 16, 1997 [JP] Japan ................................. 9-346764
Mar. 10, 1998 [JP] Japan ................................ 10-058184

[51] Int. Cl.⁷ ........................................... H05B 3/78
[52] U.S. Cl. .................................... 392/485; 165/151
[58] Field of Search ................................. 392/485, 486, 392/491, 347, 379, 360, 365; 165/172–175, 148–153; 219/530, 34, 36, 44, 46, 48, 50, 52, 202, 505

[56] References Cited

U.S. PATENT DOCUMENTS 5,311,935  5/1994  Yamamoto et al. ................. 165/152

FOREIGN PATENT DOCUMENTS 63-203411  8/1988  Japan.

*Primary Examiner*—John A. Jeffery
*Assistant Examiner*—Thor Campbell
*Attorney, Agent, or Firm*—Harness, Dickey & Pierce, PLC

[57] ABSTRACT

An electric heat emitter is disposed at a predetermined position in a heat exchanging core portion having a plurality of tubes and corrugated fins. The electric heat emitter includes a positive electrode plate and a negative electrode plate which are insulated from the heat exchanging core portion. An electric wiring cover made of resin having a positive electrode wiring member and a negative electrode wiring member is attached to an outlet tank of the heat exchanger. The positive and negative electrode plates connect to the positive and negative electrode wiring members respectively. Thus, the electric current is supplied to the electric heat emitter through an electric circuit insulated from the heat exchanger, thereby preventing metal parts of the heat exchanger from being electrically corroded.

8 Claims, 14 Drawing Sheets

HEATING HEAT EXCHANGER WITH ELECTRIC HEAT EMITTER

CROSS REFERENCE TO RELATED APPLICATION

This application is based on and incorporates herein by reference Japanese Patent Application Nos. Hei 9-64788 filed on Mar. 18, 1997, Hei 9-346764 filed on Dec. 16, 1997, and Hei 10-58184 filed on Mar. 10, 1998.

BACKGROUND OF THE INVENTION

1. Field of the Invention

The present invention relates to a heat exchanger for heating a passenger compartment of a vehicle by carrying out heat exchange between air and hot water (engine coolant), to which an electric heat emitter is attached.

2. Description of Related Art

A heating heat exchanger to which an electric heat emitter is attached is disclosed in Japanese Patent Publication No. 63-20341. According to this heat exchanger, the electric heat emitter is integrated with the heat exchanger to heat air by carrying out heat exchange between the air and hot water (engine coolant). The heat emitted from the electric heat emitter radiates to the air through corrugated fins of the heat exchanger. Such a configuration simplifies a heat radiating mechanism of the electric heat emitter. Further, the pressure loss of the air flowing in a heating unit casing that is typically caused by an independent electric heat emitter is decreased.

However, according to the above conventional heat exchanger, the ground side electrode of the electric heat emitter is connected to a metal tube through which the hot water flows, and which supports the electric heat emitter. The tube is connected to a vehicle body through the heat exchanger to ground. Therefore, when an electric current is supplied to the electric heat emitter, the electric current flows through the metal tube. The metal tube tends to corrode because the inside of the tube contacts the hot water. Accordingly, the heat emitter current flowing through the metal tube tends to electrically corrode the tube causing the corroded part to leak water.

SUMMARY OF THE INVENTION

A first object of the present invention is to provide a heating heat exchanger with an electric heat emitter, in which an electric current is supplied to the electric heat emitter through an electric wiring mechanism insulated from the heat exchanger.

A second object of the present invention is simplify a connecting operation for connecting the electric heat emitter, attached to a core portion of the heat exchanger, to the electric wiring mechanism, which connects to an outside electric circuit.

According to a first aspect of the present invention, the electric heat emitter is disposed at a predetermined position in the heat exchanging core portion. The electric heat emitter includes a positive electrode plate and a negative electrode plate, both of which are insulated from the heat exchanging core portion. An electric wiring cover having a positive electrode wiring member and a negative electrode wiring member is attached to an inlet tank or an outlet tank of the heat exchanger. The positive end negative electrode plates connect to the positive and negative electrode wiring members respectively.

Thus, an electric current is supplied to the electric heat emitter through the positive and negative electrode wiring members and the positive and negative electrode plates. That is, the electric current is supplied to the electric heat emitter through an electric circuit insulated from the heat exchanger, thereby preventing metal parts of the heat exchanger from being electrically corroded.

According to a second aspect of the present invention, the electric wiring cover is made of elastic resin and an elastically transformable pick-like stopper. The electric wiring cover is attached to the inlet tank or the outlet tank of the heat exchanger by elastically transforming the pick-like stopper.

Thus, an attaching operation for attaching the electric wiring cover to the heat exchanger is simplified.

According to a third aspect of the present invention, the positive electrode wiring member and the negative electrode wiring member have a terminal portion at each respective end. Similarly, the positive electrode plate and the negative electrode plate have a terminal portion at each respective end. The terminal portions of the positive electrode wiring member and the negative electrode wiring member electrically connect to the terminal portions of the positive electrode plate and the negative electrode plate while press fitting with each other.

Thus, at the same time as the electric wiring cover is attached to the inlet tank or the outlet tank, both terminal portions are connected to each other. Accordingly, the number of steps of the electrically connecting operation can be reduced effectively.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF PREFERRED EMBODIMENTS

Figure 1:
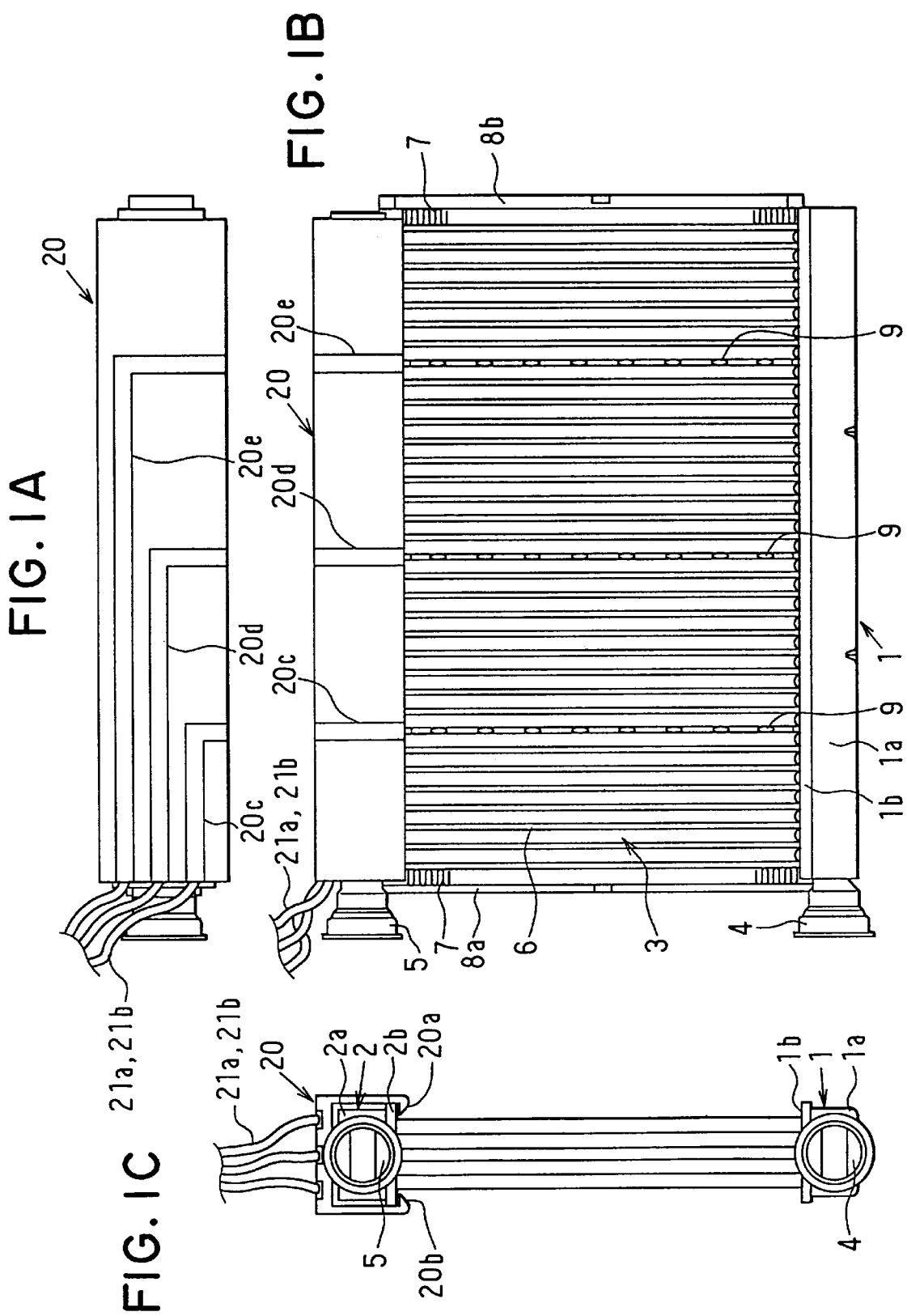
FIG. 1A is a plan view showing a heater core with an electric wiring cover.
FIG. 1B is a front view of the heater core.
FIG. 1C is a side view of the heater core.

Referring to the drawings, preferred embodiments of the present invention will be described.

(First Embodiment)

Figure 2:
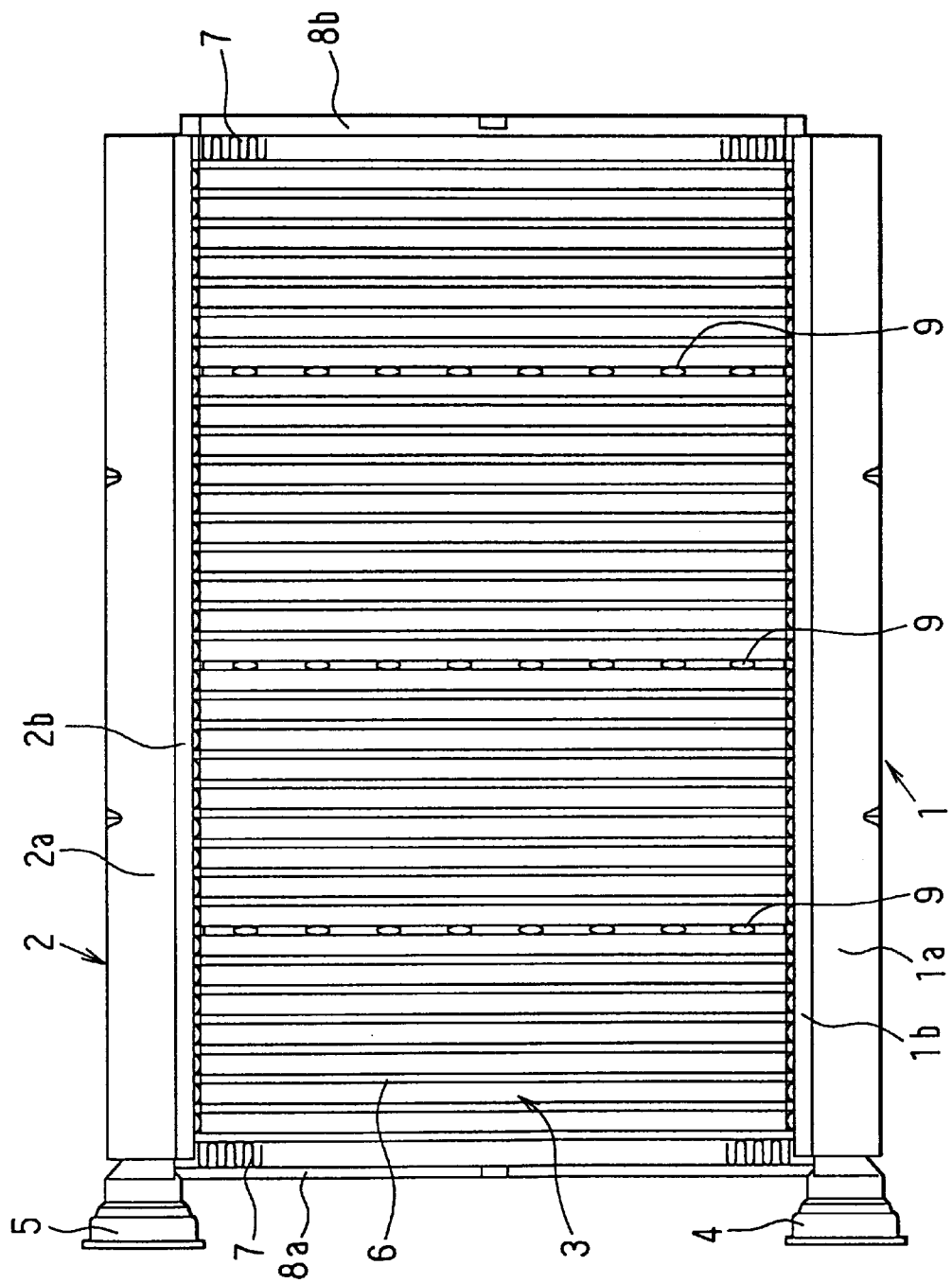
FIG. 2 is a front view showing the heater core without the electric wiring cover.

FIG. 1 shows a heater core after an electric wiring cover 20 is connected thereto, and FIG. 2 shows a heater core before the electric wiring cover 20 is connected thereto. In FIGS. 1 and 2, the heater core includes an inlet tank 1, an outlet tank 2 and a heat exchanging core portion 3 disposed between the inlet and outlet tanks 1 and 2.

An inlet pipe 4 is provided at the inlet tank 1 for introducing a hot water (engine coolant) from an engine of a vehicle into the heater core. An outlet pipe 5 is provided at the outlet tank 2 for discharging the hot water out of the heater core and recirculating the hot water to the engine. Here, the heater core is, as shown in FIG. 2, symmetrical in the upper and lower direction.

The inlet tank 1 is constructed by a tank portion 1a and a sheet metal 1b which covers the opening surface of the tank portion 1a. In a similar way, the outlet tank 2 is constructed by a tank portion 2a and a sheet metal 2b. In the sheet metals 1b and 2b, a plurality of tube insertion holes (not illustrated) are formed in parallel in the right and left direction in FIGS. 1 and 2. In the heat exchanging portion 3, a plurality of oval flat tubes 6 are disposed in parallel in the right and left direction in FIGS. 1 and 2. Each oval flat tube 6 is formed into an oval flat shape in cross section, and its longitudinal axis is parallel to the flow direction of the air to be heated (direction toward the paper side). Corrugated fins 7 are provided between a pair of adjacent oval flat tubes 6 out of plural oval flat tubes 6. Each corrugated fin 7 is formed into a wave shape and has a plurality of louvers (not illustrated) formed at a predetermined angle with respect to the air flow direction for increasing heat transmitting ability.

Both ends of the oval flat tube 6 are inserted into the tube insertion holes of the sheet metals 1b, 2b, and connected thereto. Side plates 8a and 8b formed into a cross sectional U-shape are disposed outside of the outermost corrugated fin 7 of the core portion 3. The side plates 8a and 8b are connected to the outermost corrugated fin 7 and the sheet metals 1b, 2b.

According to the present embodiment, the above-described elements 1 through 8b of the heat exchanger are made of aluminum alloy, and are connected by a brazing process using a brazing material clad on the aluminum alloy. This brazing process is carried out before a PTC heater 9 (electric heat emitter) is attached. Therefore, the corrugated fins 7 are temporarily supported by dummy plates disposed at predetermined positions where the PTC heaters 9 should be placed (three positions in FIGS. 1 and 2). Each dummy plate is made of a material not to be brazed and has the same physical constitution as the PTC heater 9.

The temporarily assembled heat exchanger is carried to a brazing furnace while being supported by a jig, and brazed integrally by being heated to the melting point of the brazing material. When this brazing process is completed, the dummy plates are indisposed from the core portion 3, and the PTC heaters 9 are placed at the predetermined positions of the core portion 3.

Figure 3:
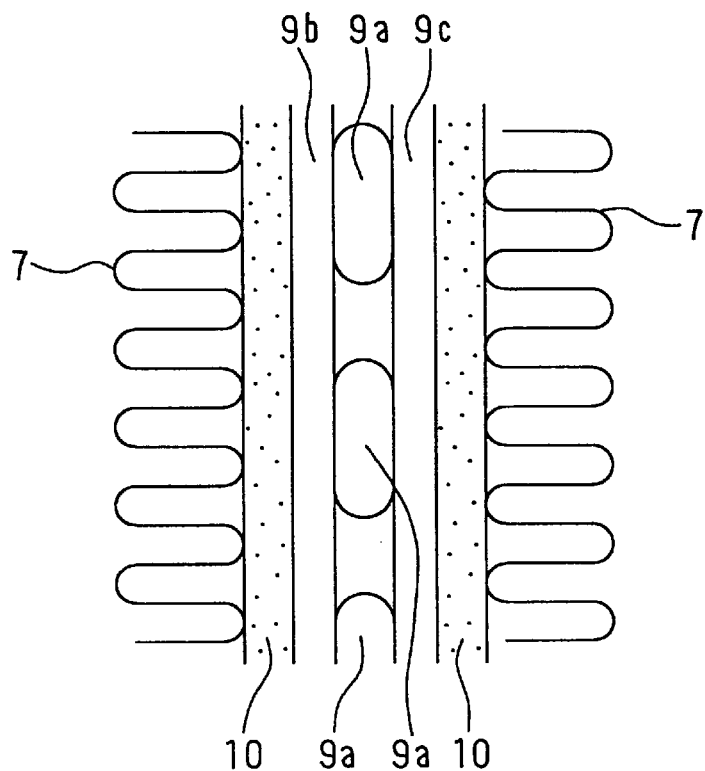
FIG. 3 is an enlarged view showing a portion where a PTC heater is placed.

FIG. 3 shows a detailed structure where the PTC heater 9 is disposed. The PTC heater 9 is constructed by plural PTC elements 9a (heat emitting element) and two electrode plates 9b and 9c connected to both side surfaces of the PTC element 9a. That is, the PTC heater 9 is like a sandwiched structure in which the electrode plates 9b, 9c sandwich the PTC element 9a. The PTC element 9a is formed into a disk-shape, and the electrode plates 9b, 9c are each formed into a rectangular plate-shape. Here, the PTC element 9a is made of a resistant material (for example, barium tinanate) of which resistant value abruptly increases at a predetermined temperature $T_0$ (for example, about 90° C.). The PTC element 9a generates heat when energy from a battery equipped on a vehicle is supplied to the electrode plates 9b, 9c.

The electrode plates 9b, 9c are made of a conductive metal such as aluminum and fixed to the folded top portion of the corrugated fins 7 adjacent to each other with an insulating adhesive 10. Both ends of the PTC heater 9 in its longitudinal direction (upper and lower direction in FIGS. 1 and 2) are spaced apart from the sheet metal 1b and 2b by a predetermined gap and electrically insulated.

The insulating adhesive 10 is made from resin having an electrically insulating function and a good heat transmitting function. Therefore, the heat generated by the PTC element 9a is transmitted to the corrugated fin 7 and emitted from the corrugated fin 7 to the air to be heated.

Here, instead the insulating adhesive 10, the PTC heater 9 may be covered with an insulating cover material without an adhesive function (for example, high heat-proof resin such as polyimide resin). In this case, the PTC heater covered with the insulating cover is inserted into the position where the dummy plate is disposed, and press supported between the adjacent corrugated fins 7 by tightening the side plates 8a and 8b of the core portion 3 with a tightening member (band member).

Figure 4:
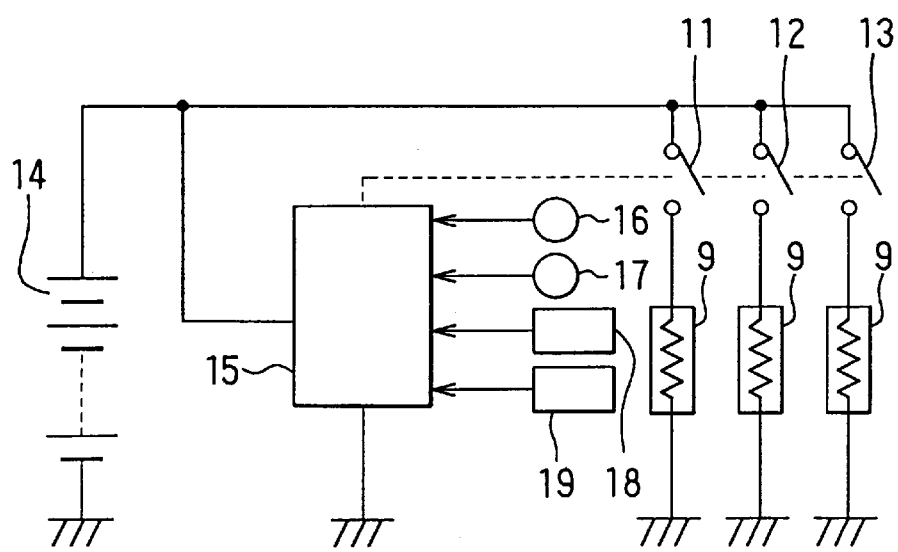
FIG. 4 shows an electric circuit including the PTC heater.

As shown in FIG. 4, three PTC heaters 9 are connected electrically in parallel, and energized through relay switches 11, 12, 13 from the battery equipped on the vehicle. These relay switches 11, 12, 13 are controlled to open/close independently by a controlling unit 15. Signals from a water temperature sensor 16, an external air temperature sensor 17, a maximum heat signal means 18 and an electric charge-discharge balance signal means 19 are input to the controlling unit 15 to control the relay switches 11, 12, 13. Here, the water temperature sensor 16 detects a temperature of the hot water flowing from the engine into the heater core. The external air temperature sensor 17 detects an external air temperature. The maximum heat signal means 18 then outputs a signal of the maximum heat operation, and the electric charge-discharge balance signal means outputs a signal according to the electric charge-discharge balance of the battery.

An electric wiring structure, used to connect the PTC heaters 9 and the rely switches 11 through 13 and to ground the heaters 9 will be explained. The electric wiring cover 20 connected to the outlet tank 2 is formed into a cross sectional U-shaped gutter, as shown in FIG. 5.

The electric wiring cover 20 is made of an elastic resin (electric insulating material), such as polypropylene, that has elastic pick-like stoppers 20a and 21b. At the outer surface of the electric wiring cover 20, three concave portions 20c, 20d, 20e are formed that correspond to the PCT heaters 9. These concave portions 20c, 20d, 20e are formed on the front surface and the top surface of the electric wiring cover 20, as shown in FIGS. 1A and 1B. The concave portions 20c, 20d, 20e are elongate in the upper and lower direction on the front surface, and bend with a right angle to reach the end portion (left end portion in FIGS. 1A and 1B) in the longitudinal direction of the cover 20 on the top surface.

Figure 5:
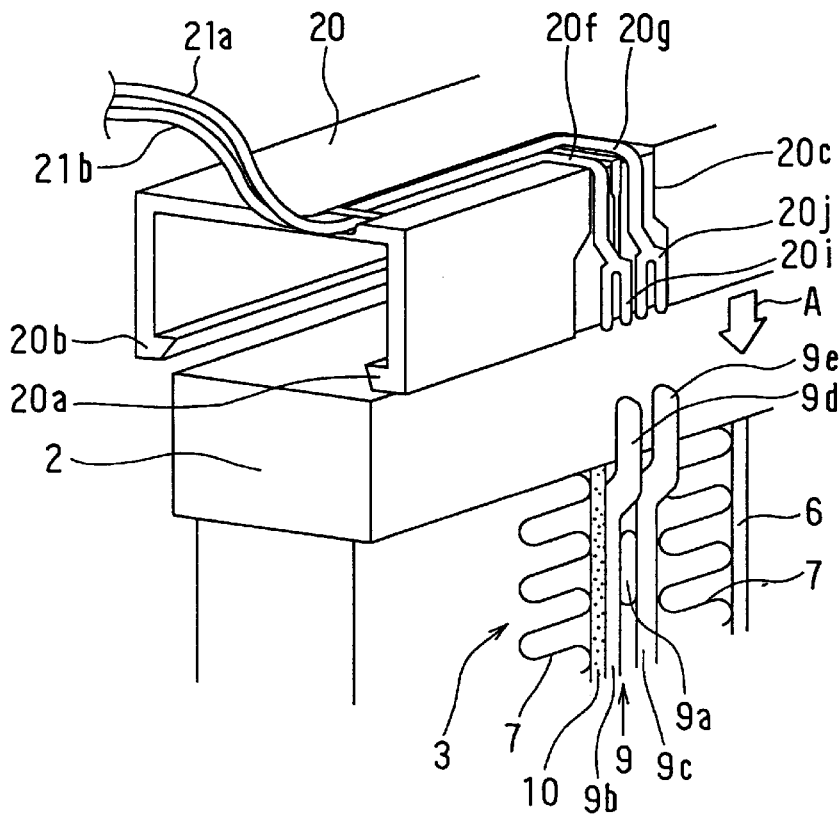
FIG. 5 is a perspective view showing a principal part where the electric wiring cover is attached to the heater core.
Figure 6:
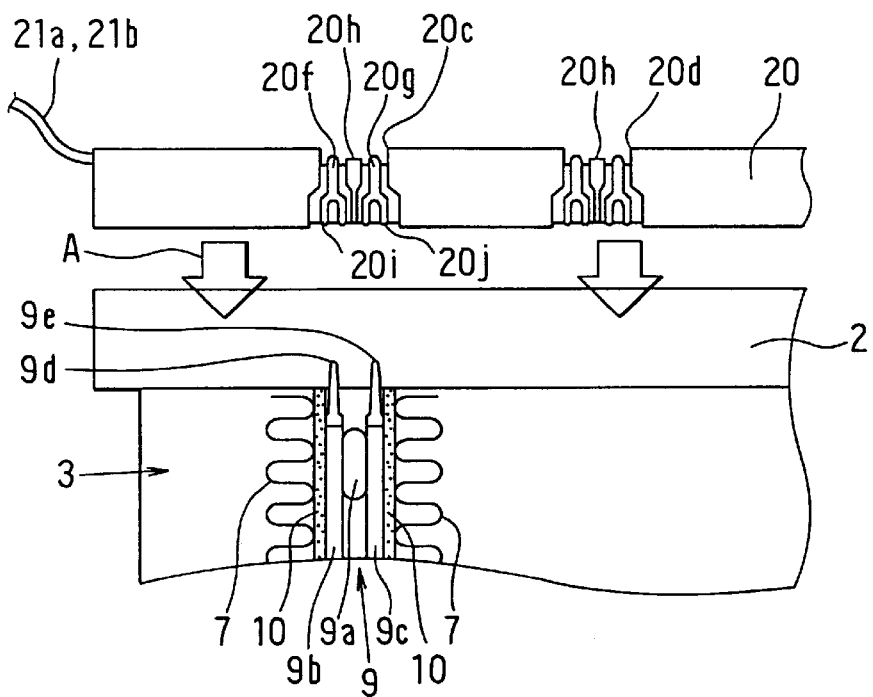
FIG. 6 is a front view showing the principal part where the electric wiring cover is attached to the heater core.

As shown in FIGS. 5 and 6, a positive side wire plate 20f and a negative side (ground side) wire plate 20g are press fixed to each concave portion 20c, 20d, 20e. These wire plates 20f and 20g are made of a conductive metal such as aluminum. The thickness of the wire plates 20f, 20g are set to be thinner than the depth of each concave portion 20c, 20d, 20e. Thus, the wire plates 20f, 20g do not protrude out of the outer surface of the electric wiring cover 20.

In each concave portion 20c, 20d, 20e, a projection portion 20h is formed for setting a gap between both wire plates 20f, 20g to electrically insulate therebetween.

Lead wires 21a, 21b are electrically connected to one end of the wire plates 20f, 20g at the left end portion of the cover 20 by welding or screwing, for electrically connecting the plates to an outside electric circuit. The positive electrode lead wire 21a is connected to the relay switches 11, 12, 13, while the negative electrode lead wire 21b is connected to the metal conducting portion of the vehicle to be grounded.

At the other end of the wire plates 20f, 20g which face the upper end of the PTC heater 9, female terminal portions 20i and 20j, which branch like a fork, are formed integrally.

In the upper end of the PTC heater 9, male terminal portions 9d, 9e are formed at the top end of the electrode plates 9b, 9c integrally for being inserted to the female terminal portions 20i, 20j. These male terminal portions 9d, 9e are bent from the top end of the electrode plates 9b, 9c to be spaced apart from the outer surface of the outlet tank 2 by a predetermined gap.

According to the above-described structure, as denoted by an arrow A in FIGS. 5 and 6, the electric wiring cover 20 is press fixed to the outlet tank 2 from the upper side by elastically broadening the pick-like stoppers 20a, 20b of the electric wiring cover 20 outwardly. Accordingly, the electric wiring cover 20 is electrically connected to the outlet tank 2, and the wire plates 20f, 20g are electrically connected to the electrode plates 9d, 9e of the PTC heater 9 easily.

As shown in FIG. 1C, when the pick-like stoppers 20a, 20b reach the lower end surface of the outlet tank 2 (the lower end surface of the sheet metal 2b), the pick-like stopper portions 20a, 20b are attached to the lower end surface by the resilient force of the stopper portions 20a, 20b. At the same time, the male terminal portions 9d, 9e are inserted to the female terminal portions 20i, 20j, thus the wire plates 20f, 20g are electrically connected to the electrode plates 9b, 9c of the PTC heater 9.

As above explained, the electric wiring cover 20 is attached to the outlet tank 2 elastically by the elastic pick-like stoppers 20a, 20b. Thus the electric wiring cover 20 is detachable from the heater core.

Figure 7:
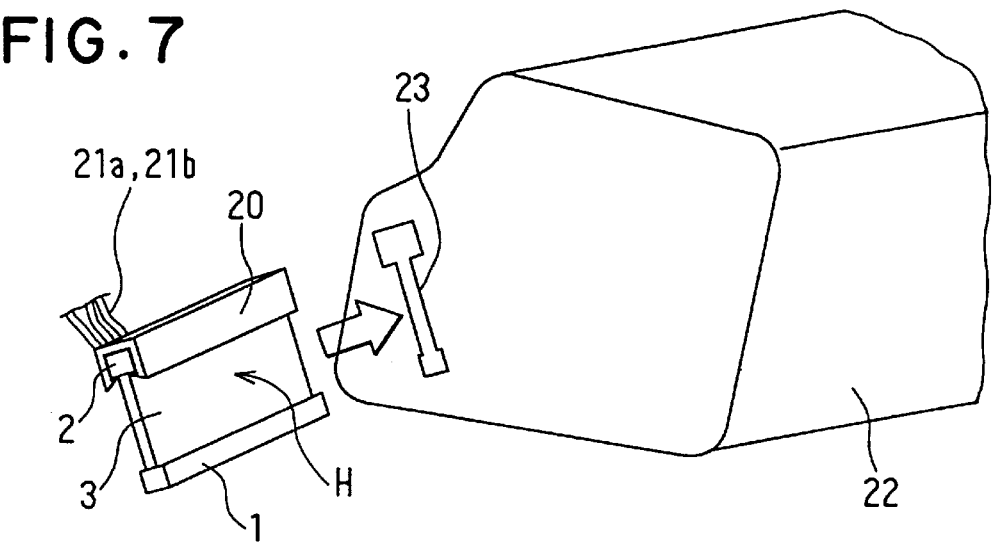
FIG. 7 is a perspective view showing a way of attaching the heater core to an air-conditioning unit casing.
Figure 8:
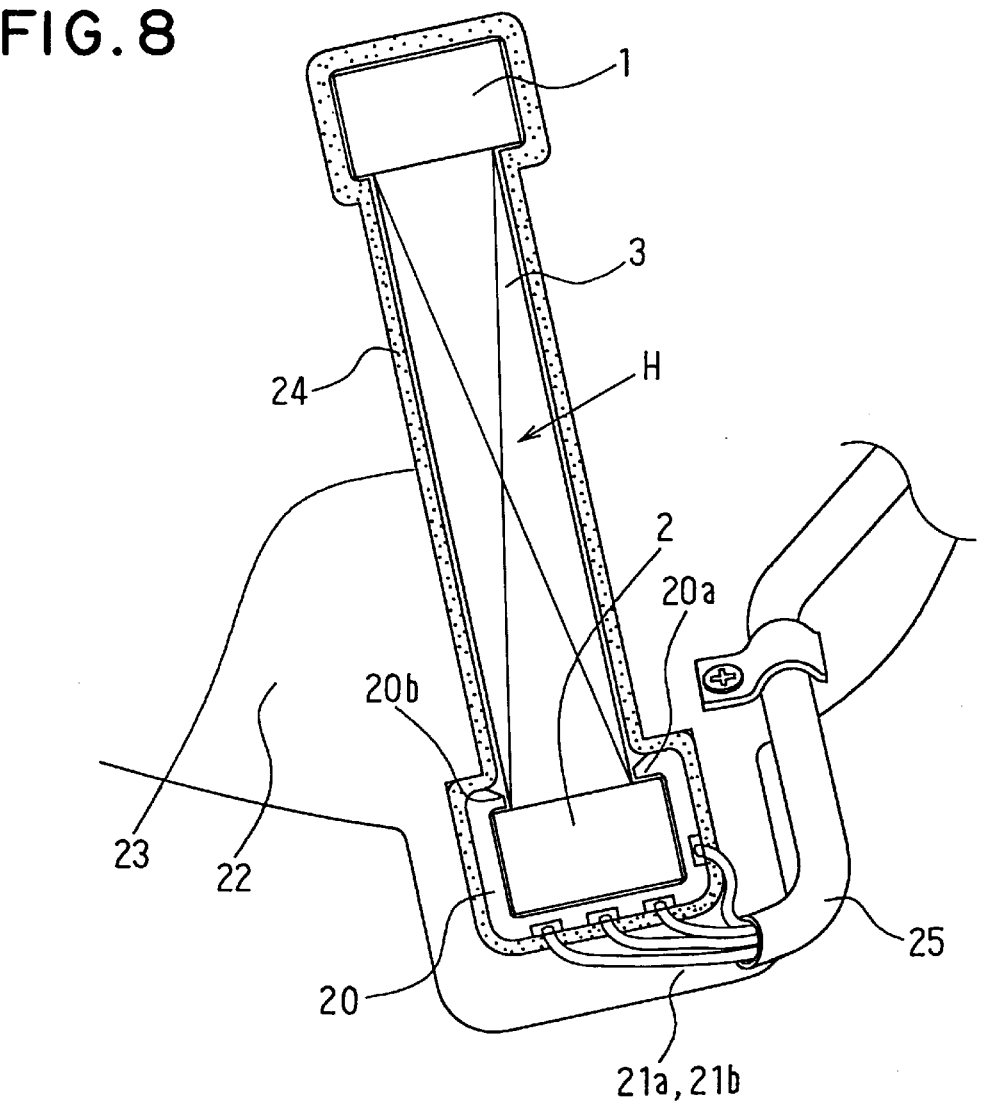
FIG. 8 shows the heater core disposed in the air-conditioning unit casing.

The heater core in which the electric wiring cover 20 is connected to the outlet tank 2 is, as shown in FIGS. 7 and 8, housed within a vehicle air-conditioning unit casing 22. In the air-conditioning unit casing 22, an insertion hole 23 that is shaped to correspond to the outer shape of the heater core is formed for inserting the heater core with the electric wiring cover 20 thereinto. In this way, the heater core with the electric wiring cover 20 is disposed inside of the air-conditioning unit casing 22.

As shown in FIG. 8, a packing 24 is provided between the inside peripheral wall of the insertion hole 23 and the outside of the heater core H for preventing an air leak. The air inside of the air-conditioning unit casing 22 is prevented from leaking to the outside thereof through the insertion hole 23 by press fitting the packing 23 to the inlet and outlet tanks 1, 2, and to the side plates 8a, 8b. The lead wires 21a, 21b drawn from the electric wiring cover 20 are combined together and covered with a vinyl tube 25. The lead wires 21a, 21b covered with the vinyl tube 25 are connected to the outside electric circuit.

An operation of the above-described heating system will be explained.

When a heating operation is carried out, a blower fan (not illustrated) generates an air flow, causing the air to flow inside the air-conditioning unit casing 22. The air passes through the space between the oval flat tube 6 and the corrugated fin 7 in the heat exchanging core portion 3. As a water pump of the vehicle engine operates, the hot water flows from the engine into the inlet tank 1 of the heater core through the inlet pipe 4.

The hot water in the inlet tank 1 is distributed into the plural oval flat tubes 6 and flows inside the tubes 6 while radiating its heat to the air. The hot water, after flowing through the plural tubes 6, is collected in the outlet tank 2, and there-after flows out of the heater core through the outlet pipe 5 to recirculate to the engine.

During the heating operation, when the hot water temperature is lower than a predetermined temperature (for example, 80° C.), the controlling unit 15 controls the relay switches 11, 12, 13 in accordance with the input signals from the water temperature sensor 16, external air temperature sensor 17, the maximum heating signal means 18 and the electric charge/discharge balancing signal means 19. That is, while the maximum heating operation is carried out, the controlling unit 15 increases the number of the PTC heaters generating heat when the hot water temperature and the external air temperature are low. At the same time, the controlling unit 15 controls the relay switch so that the battery equipped on the vehicle does not discharge excessively.

When an electric current is supplied, the PTC heater generates heat. The PTC heater 9 itself rises to its self-control set temperature $T_0$, and emits its heat to the air through the corrugated fin 7. Therefore, even when the hot water temperature is low, the air is heated quickly.

Here, the resistant value of the PTC heater increases abruptly at the predetermined temperature $T_0$. Thus, the PTC heater can self-control its heat generating temperature up to the self-control set temperature $T_0$.

The electrode plates 9b, 9c and the wire plates 20f, 20g are electrically insulated from the heater core made of aluminum. That is, the heater core is electrically insulated from the electric circuit of the PTC heater. Therefore, an electric current supplied to the PTC heater does not flow through the heater core. Accordingly, each part of the heater core is prevented from electrically corroding.

(Second Embodiment)

Figure 9:
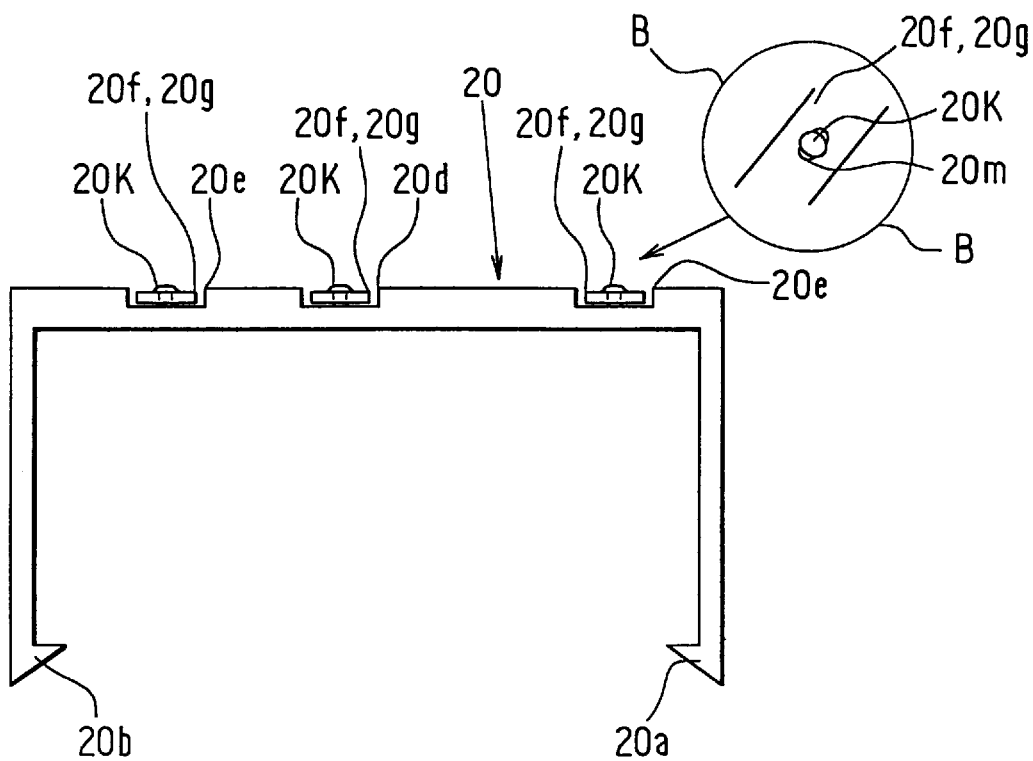
FIG. 9 shows an electric wiring cover according to a second embodiment.

In the second embodiment, as shown in FIG. 9, plural connecting pins 20k are formed integrally in the concave portions 20c, 20d, 20e of the electric wiring cover 20. These connecting pins 20k are inserted into connecting holes 20m (see B in FIG. 9) formed in the wire plates 20f, 20g for fixing the connecting pins 20f, 20g to the concave portions 20c, 20d, 20e.

Here, in FIG. 9, only one of the wire plates 21f, 21g is illustrated for simplifying the drawing. However, in practice, both wire plates 21f, 21g are disposed in the concave portions 20c, 20d, 20e in such a manner that the plates are electrically insulated from each other.

(Third Embodiment)

Figure 10:
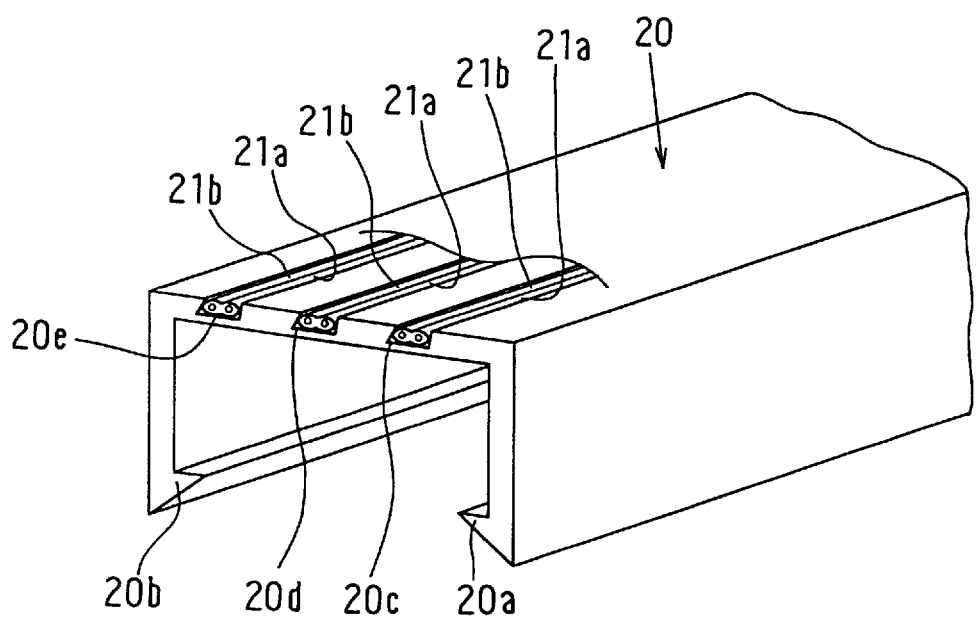
FIG. 10 is a perspective view showing an electric wiring cover according to a third embodiment.

According to the third embodiment, as shown in FIG. 10, instead of the wire plates 20f, 20g in the first and second embodiments, a coupled positive side lead wire 21a and the negative side lead wire 21b are press fit to the concave portions 20c, 20d, 20e of the electric wiring cover 20. The female terminal portions 20i, 20j are connected to the end of the lead wires 21a, 21b by welding.

(Fourth Embodiment)

Figure 11:
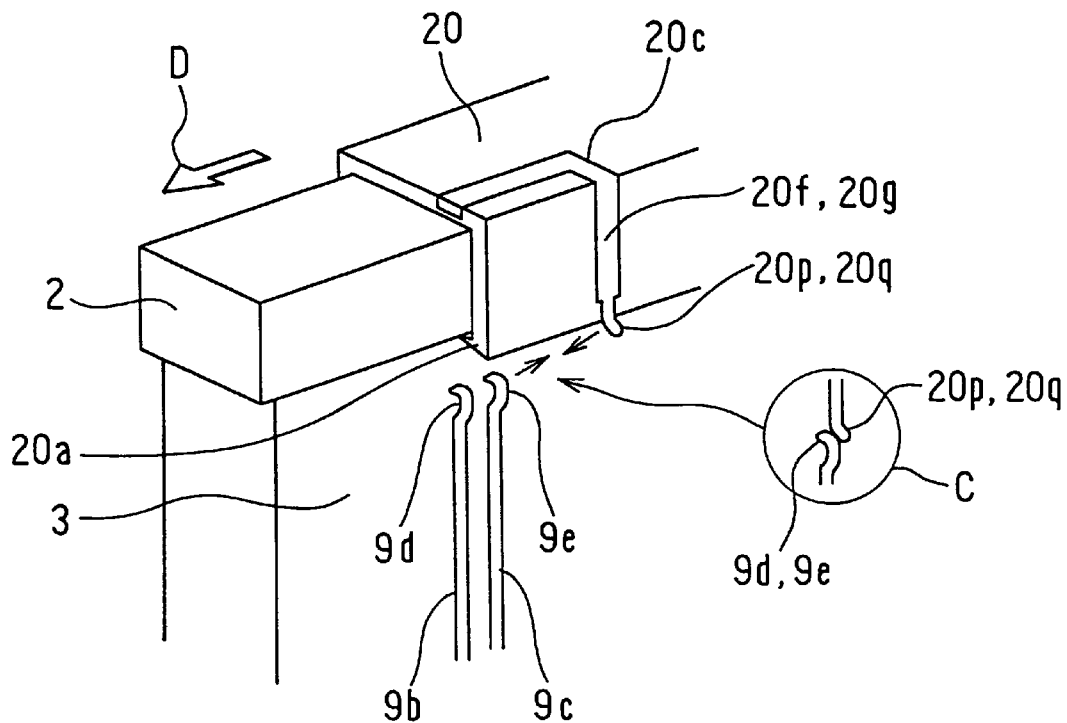
FIG. 11 is a perspective view showing a way of attaching an electric wiring cover to the heater core according to a fourth embodiment.

According to the fourth embodiment, as shown in FIG. 11, the electric wiring cover 20 is attached to the outlet tank 2 by being slid along the longitudinal direction (direction denoted by an arrow D) of the outlet tank 2.

In accordance with this way of attaching the electric wiring cover 20, terminal portions 20p, 20q formed at the lower ends of the wire plates 20f, 20g are folded diagonally downwardly, and terminal portions 9d, 9e formed at the upper ends of the electrode plates 9b, 9c are folded diagonally and upwardly.

When the electric wiring cover 20 is attached to the outlet tank 2 by being slid completely, the under surface of the terminal portions 20p, 20q are press contacted to the upper surface of the terminal portions 9d, 9e of the PTC heater 9. In this way, the terminal portions 20p, 20q are electrically connected to the terminal portions 9d, 9e completely.

(Fifth Embodiment)

Figure 12:
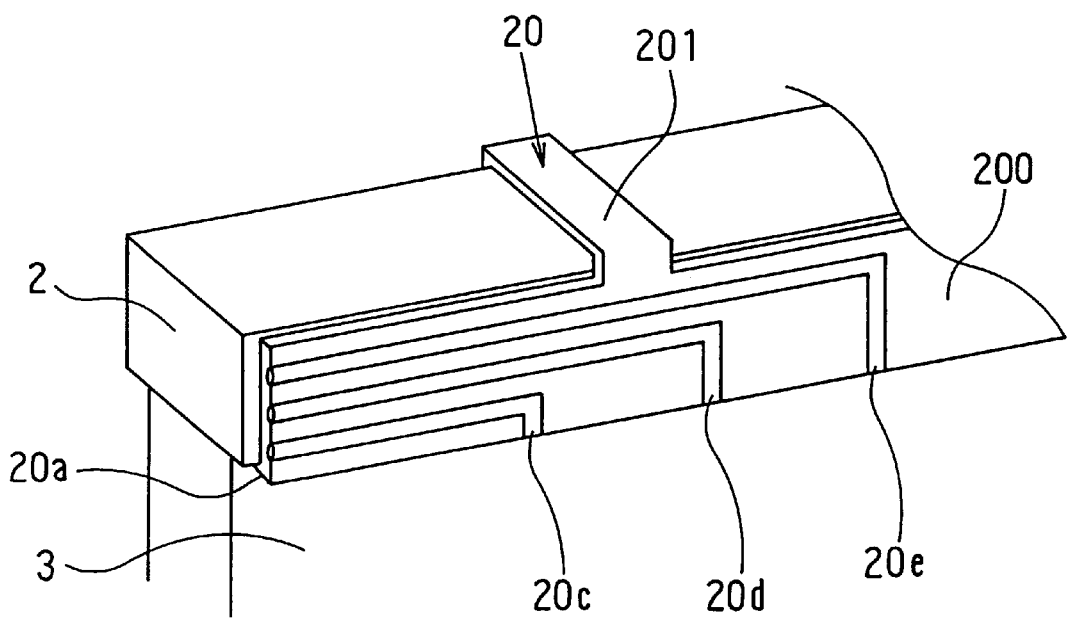
FIG. 12 is a perspective view 1 showing a principal part of the heater core with an electric wiring cover according to a fifth embodiment.

According to the fifth embodiment, as shown in FIG. 12, the electric cover 20 is formed into a shape to cover only one part of the outlet tank 2.

The electric wiring cover 20 is constructed by a wall portion 200 and a support arm 201. The wall portion 200 is formed in the longitudinal direction of the outlet tank 2 to be along the front surface of the outlet tank 2. The support arm 201 is elongate in the direction perpendicular to the longitudinal direction of the outlet tank 2. That is, the electric wiring cover 20 hardly covers the back surface and the upper surface of the outlet tank 2.

On the wall portion 200, concave portions 20c, 20d, 20e are formed. The wire plates 20f, 20g or the lead wires 21a, 121b of the PTC heater 9 are disposed in the concave portions 20c, 20d, 20e. The pick-like stopper portions 20a are formed at the lower end of the wall portion 200 and the support arm 201. The electric wiring cover 20 is attached to the outlet tank 20 at the pick-like stopper portions 20a.

(Sixth Embodiment)

According to the sixth embodiment, a magnetic shield is provided around the electric wiring cover 20 for preventing electromagnetic waves from radiating. The output power of the PTC heater 9 is about 900 W and the electric current supplied to the PTC heater is about 80 A. Thus, electromagnetic waves radiate from the electric wiring portion of the PTC heater 9. Therefore, it is desirable to provide a magnetic shield around the electric wiring cover 20.

Figure 13:
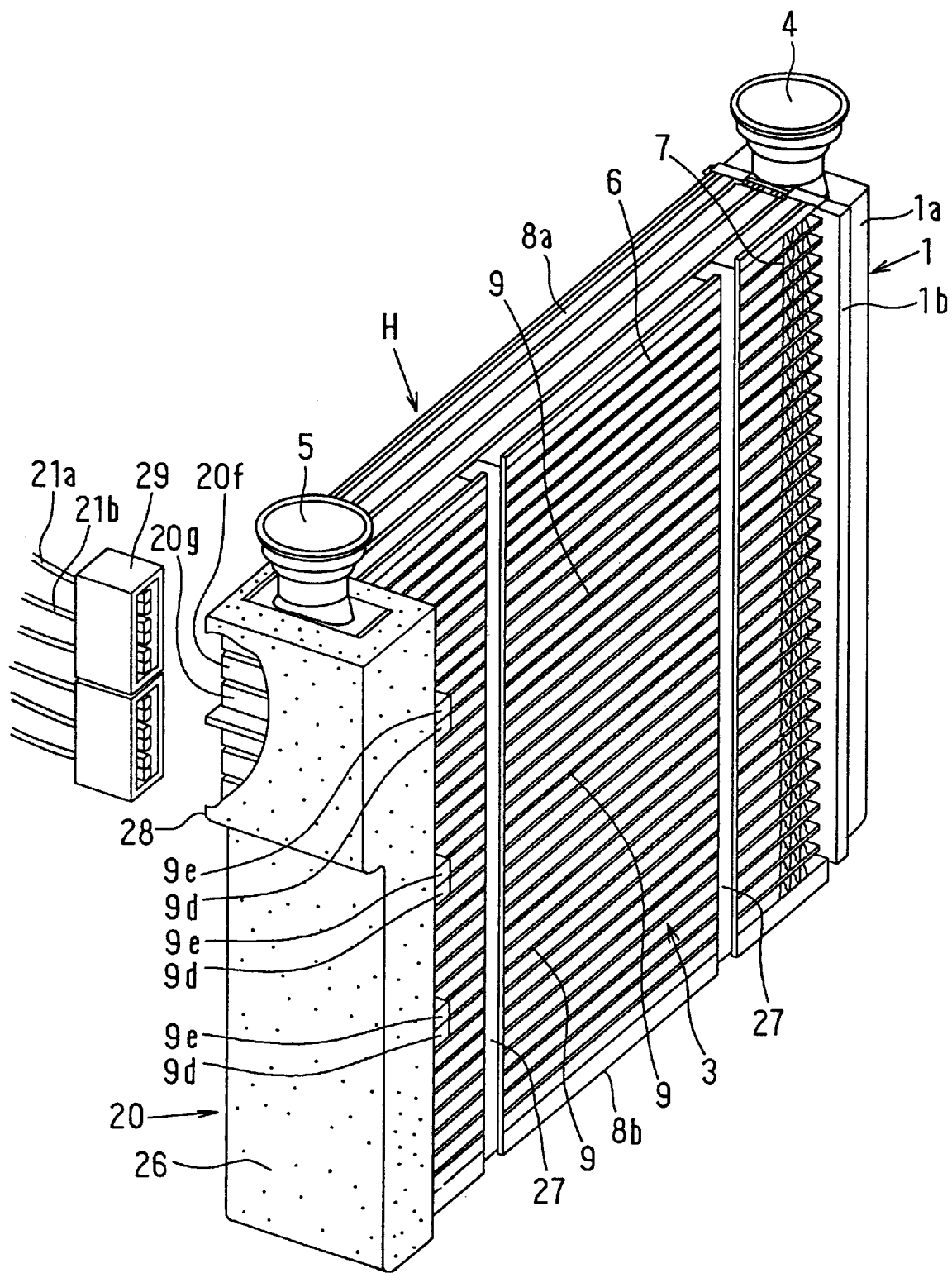
FIG. 13 is a perspective view showing the heater core with an electric wiring cover according to the sixth embodiment.
Figure 14:
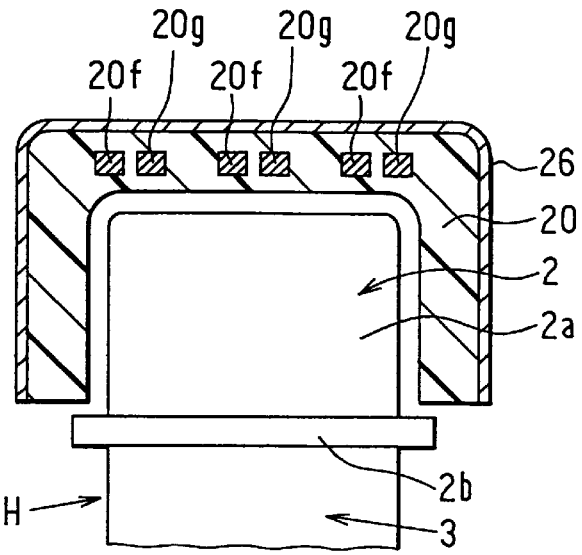
FIG. 14 is a perspective cross sectional view of the heater core according to a sixth embodiment.

As shown in FIGS. 13 and 14, according to the present embodiment, when the electric wiring cover 20 is formed, the wire plates 20f, 20g are integrally formed inside the cover 20 by insert forming. The magnetic shield 26 made of conductive material is clad on the outside of the cover 20 for absorbing the electromagnetic wave radiated from the wire plate 20f, 20g.

The magnetic shield 26 is made of a metal plate 20, such as copper or aluminum, and is integrally formed on the entire outer surface of the cover 20 when the cover is formed from resin. Here, the magnetic shield 26 can be constructed by a net-like body instead of a plate-like body. Further, the magnetic shield 26 can be constructed by coating a conductive coating material on the entire outer surface of the cover 20.

Here, in FIG. 13, a dotted area denotes the magnetic shield 26 provided around the cover 20. In this heater core, three PTC heaters 9 are disposed between the pair of adjacent corrugated fins 7 at predetermined positions in such a manner that the plates are arranged in series in the laminating direction of the oval flat tubes 6 in the core portion 3. The PTC heaters 9 are press supported between the pair of adjacent corrugated fins 7 by tightening the core portion 3 with two tightening members (band member) 27. These tightening members 27 are made of an anti-corrosion metal, such as stainless steel, and tighten the core portion 3 in the laminating direction of the oval flat tubes 6.

At one end side of the cover 20, a connector portion 28 having a space inside thereof is formed such that the thickness of this portion is thicker than the other portions. The space inside of the connector portion 28 opens to the outside thereof, and the end of the wire plates 20f, 20g are exposed in this space. The end of the wire plates 20f, 20g are electrically connected to the lead wires 21a, 21b by inserting a connector portion 29 provided at the end of the lead wires 21a, 21b into the space inside of the connector portion 28. This electrically connecting operation can be attained by applying several means described in FIGS. 5 and 6.

(Seventh Embodiment)

Figure 15:
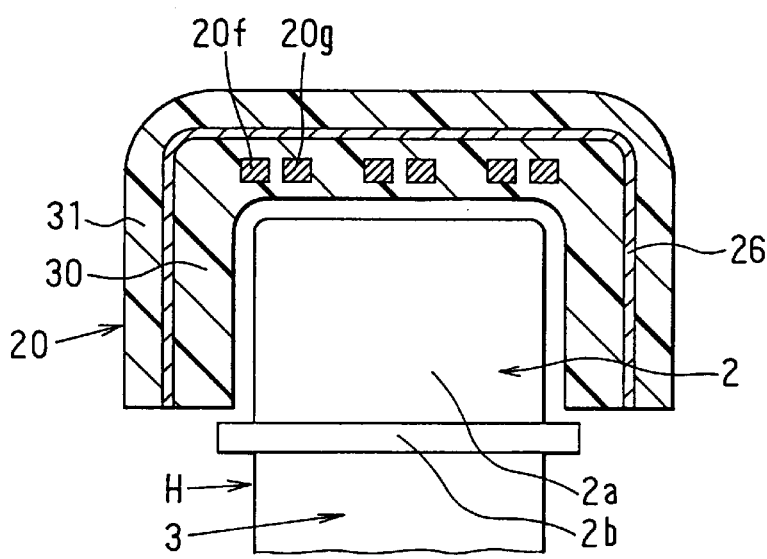
FIG. 15 is a perspective cross sectional view of the heater core according to a seventh embodiment.

According to the seventh embodiment, as shown in FIG. 15, the magnetic shield 26 is disposed in the walls of the cover 20 to cover the wire plates 20f, 20g from the outside. This magnetic shield 26 is disposed in the walls of the cover 20 by insert forming.

In the seventh embodiment, the cover 20 can be divided into an inside stratum 30 and an outside stratum 31, and the magnetic shield 26 can be fixed between the inside and outside strata 30 and 31.

(Eighth Embodiment)

Figure 16:
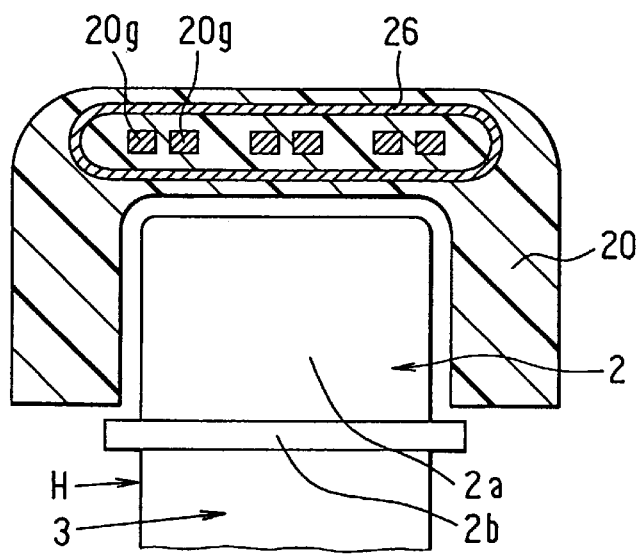
FIG. 16 is a perspective cross sectional view of the heater core according to an eighth embodiment.

According to the eighth embodiment, as shown in FIG. 16, in the walls of the cover 20, the magnetic shield 26 is formed into a cross sectional oval shape to surround the wire plates 20f, 20g.

(Ninth Embodiment)

Figure 17:
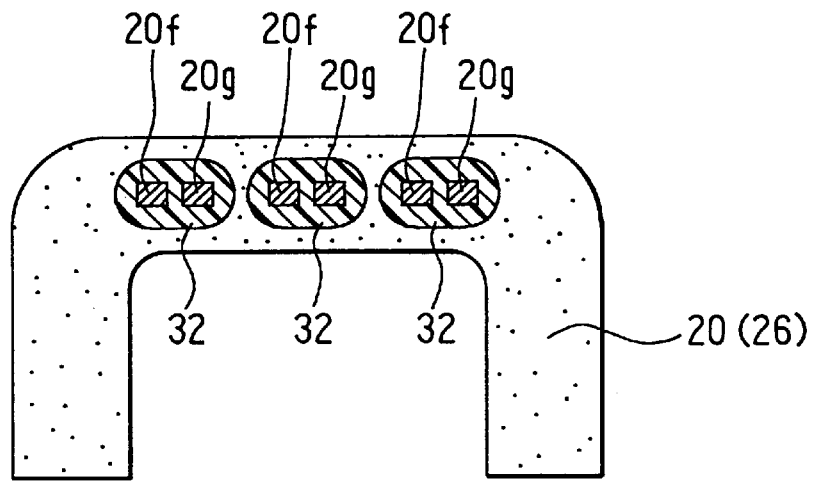
FIG. 17 is a perspective cross sectional view of the heater core according to a ninth embodiment.

According to the ninth embodiment, as shown in FIG. 17, the electric wiring cover 20 itself is made of conductive resin to be the magnetic shield 26. Here, between the wire plates 20f, 20g and the cover 20, an insulating member 32 is disposed for insulating the wire plates 20f, 20g from the cover 20.

According to the above sixth through ninth embodiments, it is not necessary to provide the magnetic shield to each wire plate 20f, 20g independently. That is, providing the magnetic shield 26 to the wire plates 20f, 20g can be attained easily.

(Tenth Embodiment)

Figure 18:
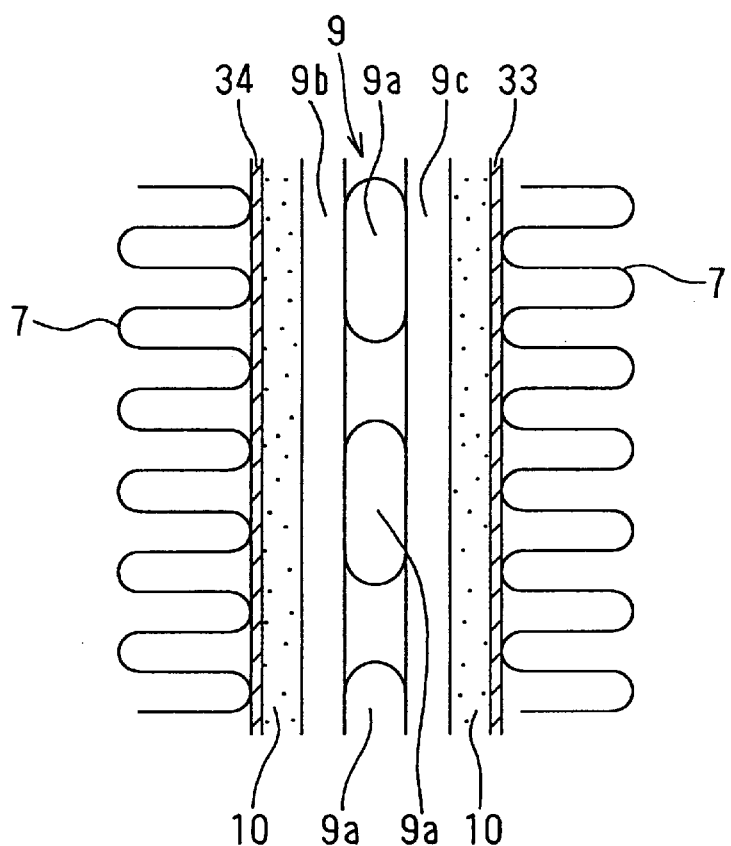
FIG. 18 is an enlarged view showing a portion where the PTC heater according to a tenth embodiment is placed.

According to the tenth embodiment, as shown in FIG. 18, the PTC heater 9 is disposed between support plates 33, 34. The support plates 33, 34 are made of aluminum, and contact the folded top portions of the corrugated fin 7. The support plates 33, 34 are fixed to the corrugated fin 7 by brazing.

When the heater core assembly is brazed, dummy plates are disposed between the support plates 33, 34. After the brazing process is completed, the dummy plates are removed and the PTC heaters 9 are disposed between the support plates 33, 34. The PTC heaters 9 are fixed to the support plates 33, 34 by the insulating adhesive as in the first embodiment. This fixing operation can be attained by tightening the core portion 3 with a tightening member 27 (band member) as shown in FIG. 13.

(Eleventh Embodiment)

Figure 19:
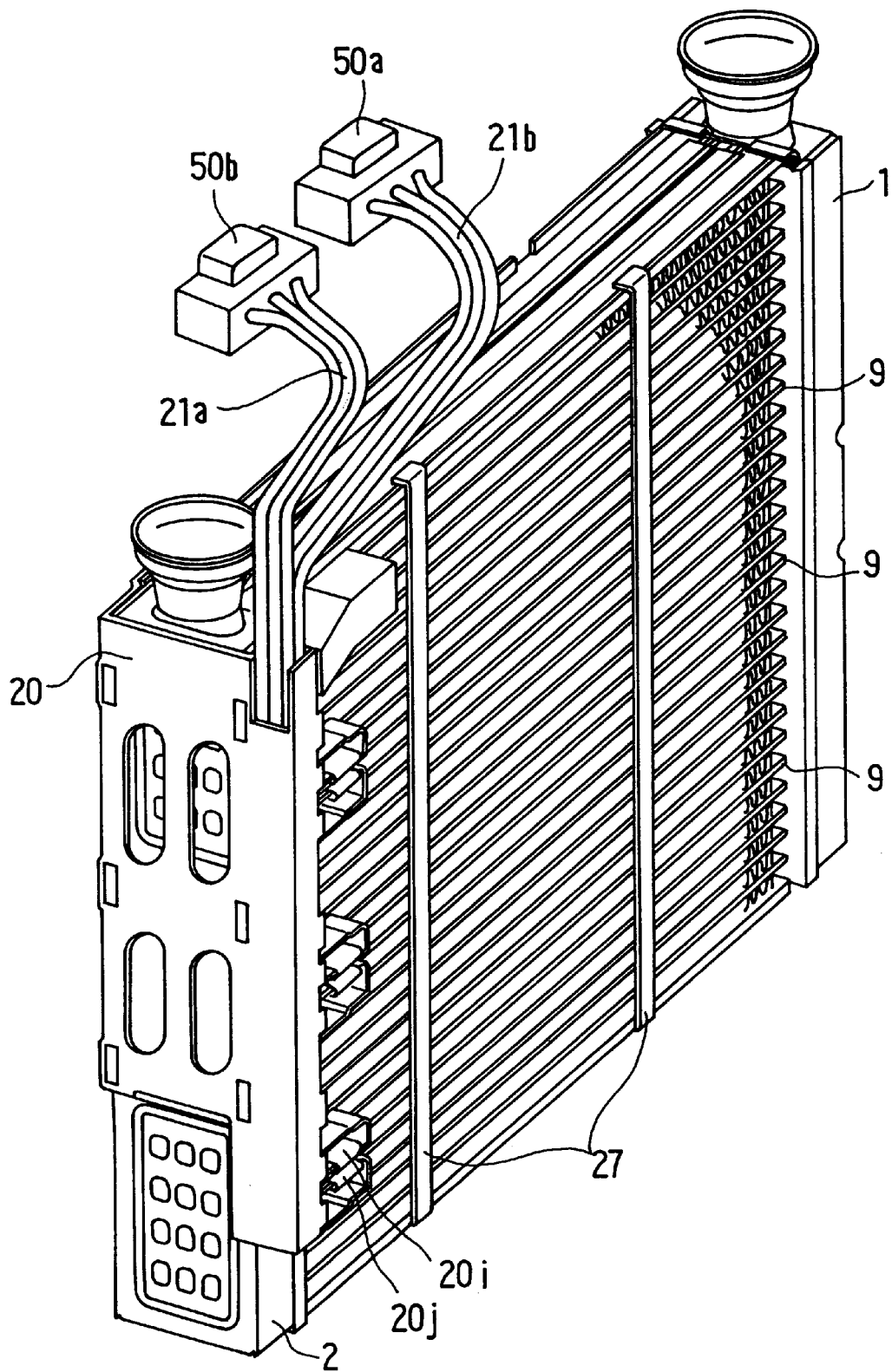
FIG. 19 is a perspective view showing the heater core with an electric wiring cover according to an eleventh embodiment.
Figure 20A:
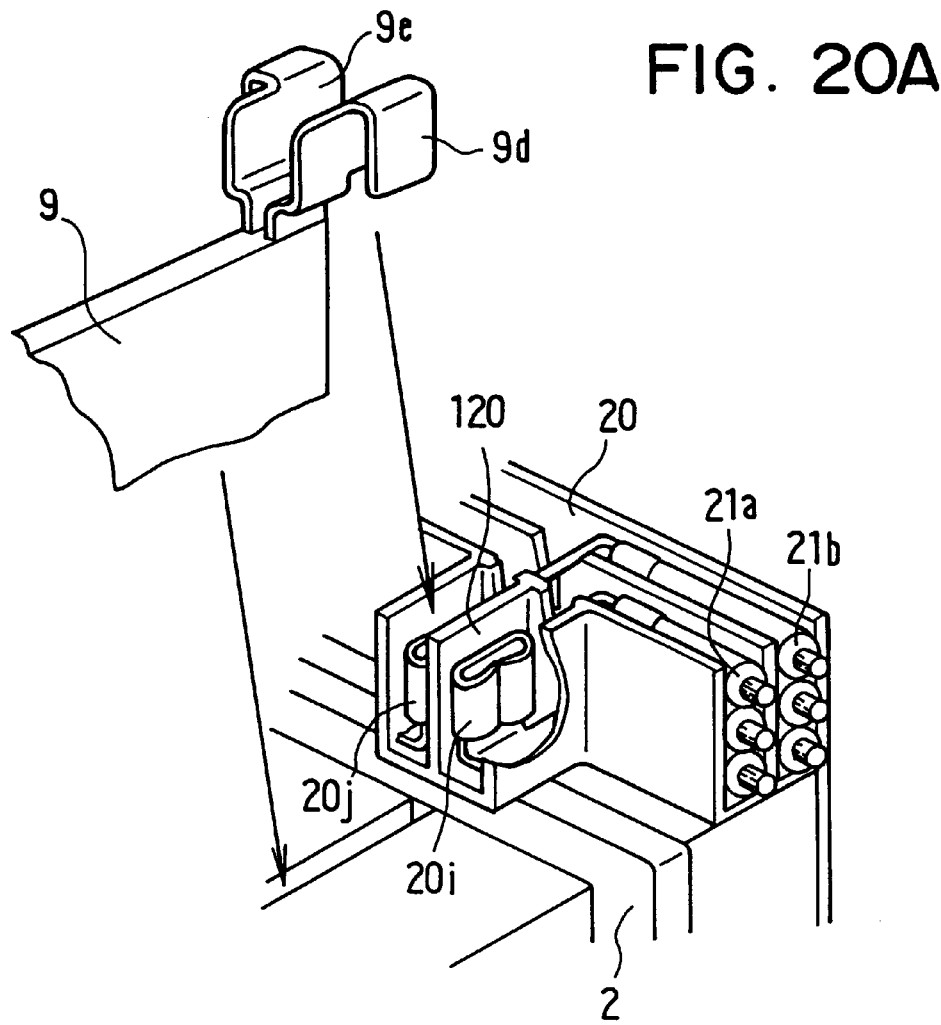
FIG. 20A is a perspective view showing a way of attaching a PTC heater to the heater core according to the eleventh embodiment.
Figure 20B:
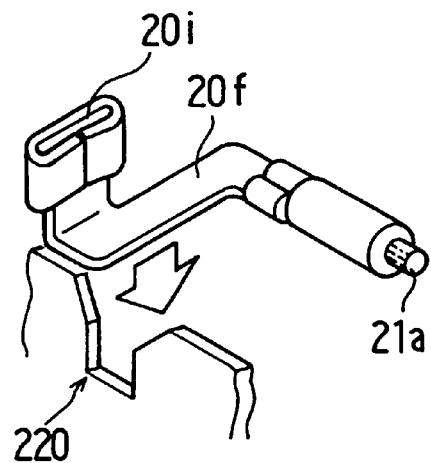
FIG. 20B shows a way of fixing a wire plate to an electric wiring cover according to the eleventh embodiment.

According to the eleventh embodiment, as shown in FIG. 19, the lead wires 21a, 21b are put in the electric wiring cover 20. At one end of the lead wires 21a, 21b, connector portions 50a, 50b are provided for electrically connecting the wires to the outside electric circuit. The other end of the lead wires 21a, 21b are connected to the terminal portions 9d, 9e through the wire plates 20f, 20g and the terminal portions 20i, 20j. As shown in FIG. 20A, the positive electrode terminal portion 9d and negative electrode terminal portion 9e of the PTC heater 9 are arranged to be electrically insulated from each other. The positive electrode lead wires 21a and the negative electrode lead wires 21b are disposed in the cover 20 in such a manner that the wires are stacked in the cover 20 respectively. The wire plates 20f, 20g to which the lead wires 21a, 21b are connected are fixed in slit portions 220 of the cover 20 as shown in FIG. 20B. The terminal portions 20i, 20j are formed at the end of the wire plates 20f, 20g. The positive electrode terminal portion 20i and the negative electrode terminal portion 20j are electrically insulated from each other by a partition wall 120 of the cover 20. First, the electric wiring cover 20 including the lead wires 21a, 21b is attached to the outlet tank 2 of the heater core. Next, the PTC heater 9 is attached to the heater core from the upper side. At this time, the male terminal portions 9d, 9e of the PTC heater 9 are inserted into the female terminal portions 20i, 20j to electrically connect the lead wires 21a, 21b and the PTC heater 9.

(Twelfth Embodiment)

Figure 21A:
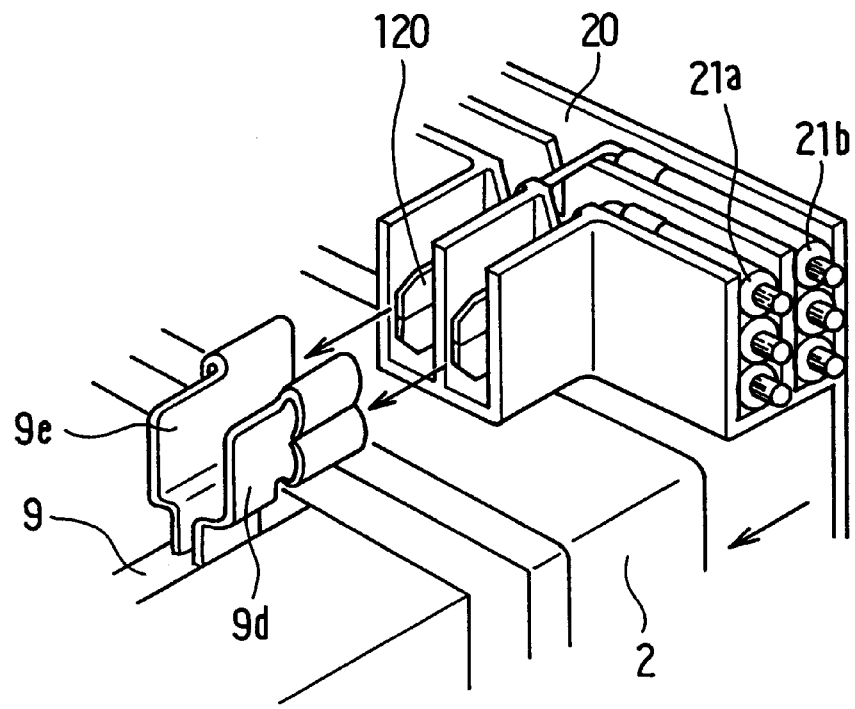
FIG. 21A is a perspective view showing a way of attaching an electric wiring cover to the heater core according to a twelfth embodiment.
Figure 21B:
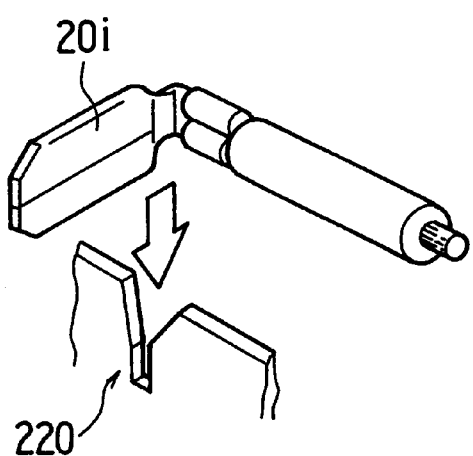
FIG. 21B shows a way of fixing a terminal portion of a wire plate to the electric wiring cover according to the twelfth embodiment.

According to the twelfth embodiment, as shown in FIG. 21A, the terminal portions of the PTC heater 9 are formed as female terminal portions, and the terminal portions 20i, 20j of the lead wires 21a, 21b are formed as male terminal portions. In the present embodiment, the PTC heater 9 is first attached to the heater core. Next, the electric wiring cover 20 is attached to the heater core from the right side. At this time, the terminal portions 20i, 20j of the lead wires 21a, 21b are inserted to the terminal portions 9d, 9e of the PTC heater 9 to electrically connect the lead wires 21a, 21b to the PTC heater 9.

(Thirteenth Embodiment)

Figure 22A:
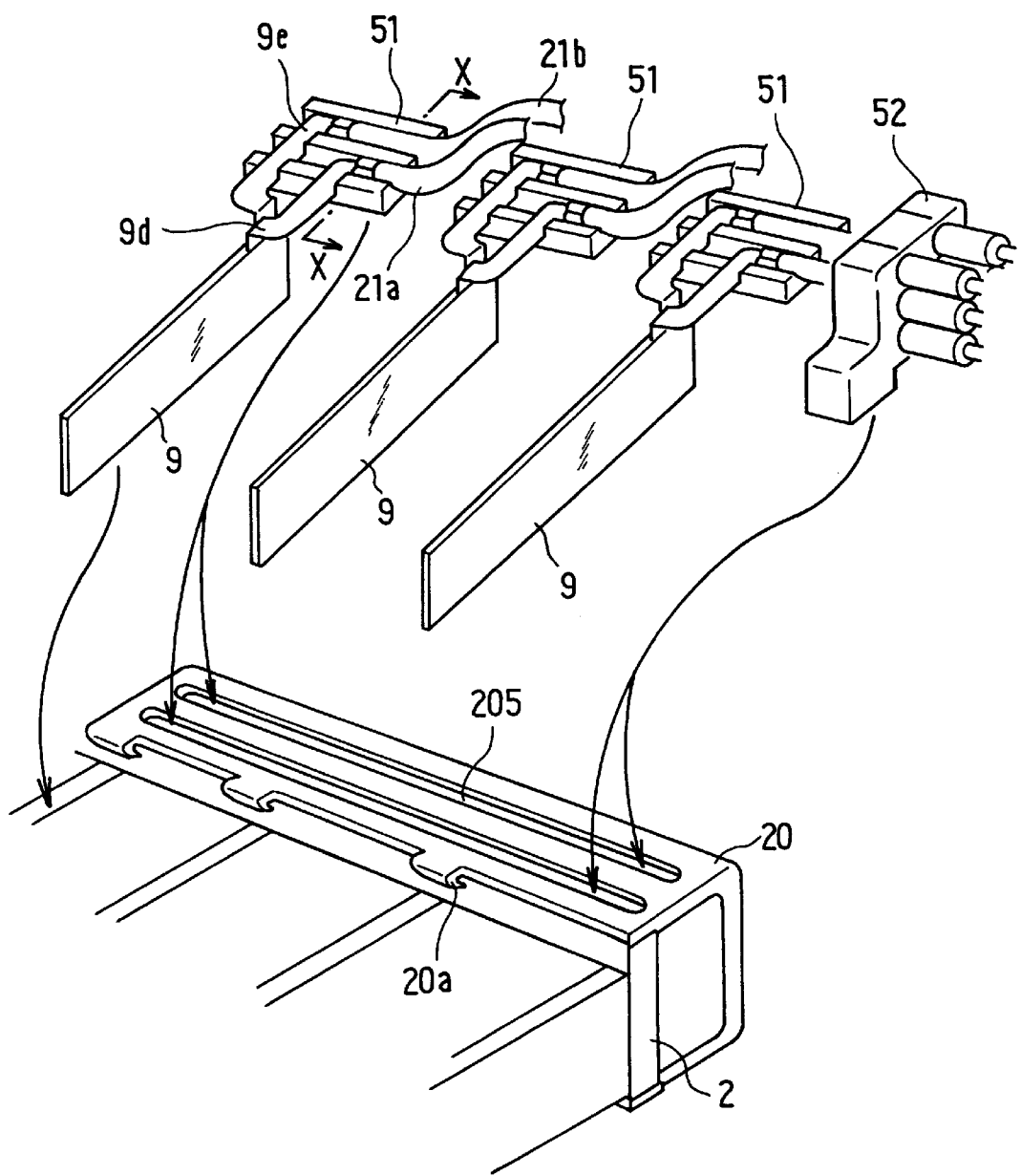
FIG. 22A is a perspective view showing a way of attaching an electric wiring cover to the heater core according to a thirteenth embodiment.
Figure 22B:
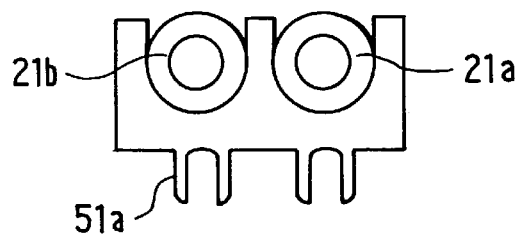
FIG. 22B is a cross sectional view taken along line X—X in FIG. 22A.

According to the thirteenth embodiment, as shown in FIG. 22A, the terminal portions 9d, 9e are connected to the lead wires 21a, 21b by caulking or welding. The lead wires 21a, 21b are disposed and fixed to a harness holder 51. Two slits 20s are formed in the electric wiring cover 20 for receiving fixing pins 51a formed at the bottom of the harness holder 51. The harness holders 51 are fixed to the cover 20 by inserting the fixing pins 51a into the slits 20s. In the present embodiment, there are three PTC heaters 9. Thus three harness holders 51 are necessary for receiving three pairs of lead wires 21a, 21b. These lead wires 21a, 21b are collected by a collecting holder 52 for improving attaching performance of the heater core and sealing ability between the heater core and a heater unit casing (not illustrated). Here, the collecting holder 52 can be replaced with an elastic packing which rolls up the lead wires 21a, 21b.

According to the above-described embodiment, the electric wiring cover 20 is attached to the outlet tank 2 of the heater core. Alternatively, the electric wiring cover 20 can be attached to the inlet tank 1.

Further, according to the above-described embodiment, the corrugated fin 7 is used as a fin member. Alternatively, a plate fin can be used as the fin member.

The disposing state of the PTC heater 9 is not limited to the state shown in FIG. 3, it is changeable in accordance with the technical specification of the heater core.

What is claimed is:

1. A heat exchanger comprising:

a heat exchanging core portion having a plurality of tubes arranged in parallel and a plurality of fin members disposed between a pair of adjacent tubes out of said tubes;

an inlet tank provided at one end of said tubes for distributing hot water into said each tube;

an outlet tank provided at the other end of said each tube for receiving the hot water;

an electric heat emitter provided at a predetermined position of said heat exchanging core portion, said electric heat emitter including a positive electrode plate, a negative electrode plate, and a heat emitting element disposed between the positive electrode plate and the negative electrode plate; and an electric wiring cover attached to said inlet tank or said outlet tank, said electric wiring cover being provided with a positive electrode wiring member and a negative electrode wiring member, wherein said positive electrode plate and said negative electrode plate are electrically insulated from said heat exchanging core portion, said positive electrode wiring member is connected to said positive electrode plate, and said negative electrode wiring member is connected to said negative electrode plate.

2. A heat exchanger according to claim 1, wherein said electric wiring cover is made of an elastic resin, said electric wiring cover has an elastically transformable pick-like stopper, and said electric wiring cover is attached to said inlet tank or said outlet tank by elastically broadening said pick-like stopper outwardly.

3. A heat exchanger according to claim 1, wherein first ends of said positive electrode wiring member and said negative electrode wiring member are connected to said positive electrode plate and said negative electrode plate respectively, and second ends of said positive electrode wiring member and said negative electrode wiring member are disposed at an end of said inlet tank or said outlet tank in a longitudinal direction thereof.

4. A heat exchanger according to claim 1, wherein said electric wiring cover has a concave portion, and said positive electrode wiring member and said negative electrode wiring member are disposed in said concave portion.

5. A heat exchanger according to claim 4, wherein said positive electrode wiring member and said negative electrode wiring member are press fixed to said concave portion.

6. A heat exchanger according to claim 1, wherein said positive electrode wiring member and said negative electrode wiring member have a connecting hole respectively, said electric wiring cover has a pin member to be inserted into said connecting hole respectively, and said positive electrode wiring member and said negative electrode wiring member are fixed to said electric wiring cover by inserting said pin member into said connecting hole.

7. A heat exchanger according to claim 1, wherein said positive electrode wiring member and said negative electrode wiring member have a terminal portion at each end thereof respectively, said positive electrode plate and said negative electrode plate have a terminal portion at each end thereof respectively, and said terminal portions of said positive electrode wiring member and said negative electrode wiring member electrically connect to said terminal portions of said positive electrode plate and said negative electrode plate while press fitting with each other when said electric wiring cover is attached to said inlet tank or said outlet tank.

8. A heat exchanger according to claim 1, wherein a magnetic shield made of electrically conductive material is provided outside said positive electrode wiring member and said negative electrode wiring member.

* * * * *